March 23, 1926.
C. R. STANTON
ANIMAL OILER
Filed May 22, 1923
1,577,938
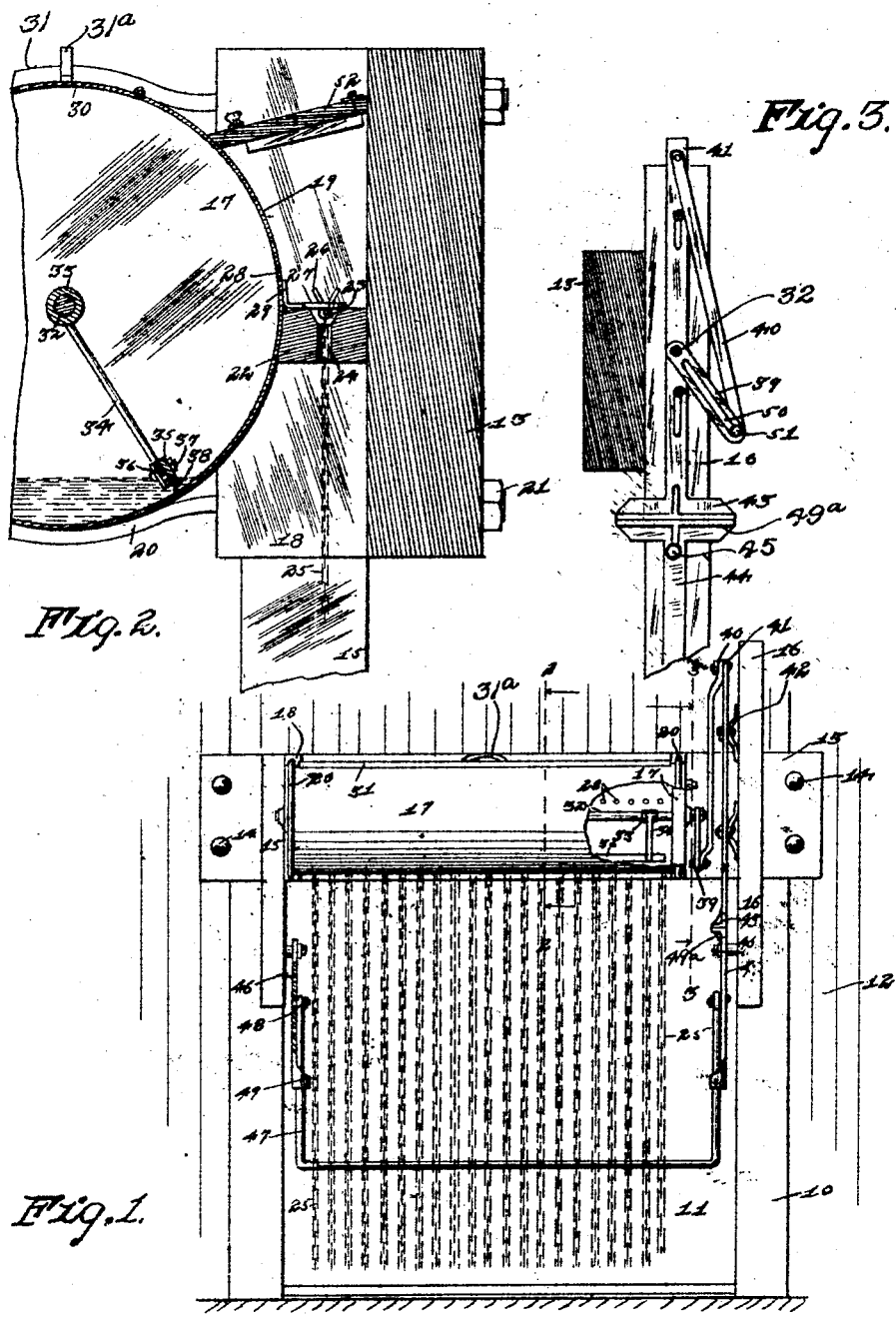
Inventor
Charles R Stanton
by Ewing & Hague, Att'ys.

Patented Mar. 23, 1926.

1,577,938

UNITED STATES PATENT OFFICE.

CHARLES R. STANTON, OF STUART, IOWA.

ANIMAL OILER.

Application filed May 22, 1923. Serial No. 640,635.

*To all whom it may concern:*

Be it known that I, CHARLES R. STANTON, a citizen of the United States, and a resident of Stuart, in the county of Guthrie, State of Iowa, have invented a certain new and useful Animal Oiler, of which the following is a specification.

The object of my invention is to provide a device which will automatically supply oil or disinfectant to small animals such as hogs and the like, for the treatment and prevention of skin diseases.

A further object is to provide a device of simple, durable and inexpensive construction which is adapted to be placed in a door-way or run-way through which animals pass, and adapted to apply oil or other disinfectant to their skins in small quantities.

A further object is to provide an animal oiler which is designed to be placed in an elevated position and provided with a container and so arranged that as the animal passes beneath the container small and measured quantities of oil or disinfectant will be automatically discharged into a suitable distributing means, the said distributing means being adapted to apply the same to the surface of the animal's skin in a uniform manner.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a front elevation of my improved device showing the manner in which it is applied to the door opening of a building through which the animals frequently pass.

Figures 2 shows a detail sectional view taken on the line 2—2 of Figure 1.

Figure 3 is a detail sectional view taken on the line 3—3 of Figure 1.

The numeral 10 indicates the frame of a door opening 11 in the wall 12 of a building. The said door opening is designed for animals to enter and leave the building.

Secured to one face of the wall 12 is a cross beam 13 located adjacent to the upper side of the door opening. This beam is secured in position by means of bolts 14. Secured to the outer face of the member 13 and near each of its ends are vertically arranged members 15 and 16.

In front of the beam 13 I have provided a cylindrical tank 17 which is slightly spaced from the said beam and parallel therewith. The tank 17 is mounted in position by means of blocks 18 provided with circular notches 19 into which the tank is set. The tank is secured in position by means of rods 20 extending around the tank and having each of their ends extended through the blocks 18 and through the member 13. The free ends of said rods are screw threaded and provided with nuts 21.

By this arrangement it will be seen that I have provided means whereby the tank will be rigidly secured in position. One of the blocks 18 is secured adjacent to the member 15, while the opposite block 18 is spaced from the member 16 a considerable distance to provide for mechanism hereinafter to be described.

Between the tank 17 and the member 13 I have provided a longitudinally extending member 22 provided with a longitudinal groove 23 in its upper face. The said groove 23 has a series of openings 24 which extend vertically through the member 22. Each of the said openings is designed to receive a vertically arranged chain 25. The upper end of each chain is secured to a cotter key 26 arranged in a vertical manner and designed to extend through a washer 27 of such diameter as to span the groove 23.

The lower ends of the chains 25 are designed to extend downwardly into the door opening 11 and have their lower ends terminate near the bottom of said opening, as clearly shown in Figure 1.

That side of the tank 17 which is adjacent to the member 13 is provided with a series of openings or perforations 28 which are slightly above the member 22. The member 22 has the outer edge of its upper face provided with an angle iron 29, one of the flanges of which is designed to rest against the tank 17 immediately below the openings 28. This angle iron is preferably soldered to the tank so that as the oil or disinfectant, which is discharged through the openings 28 by mechanism hereinafter to be described, may flow down over the top of the angle iron and into the groove 23 where it will flow to the chains 25 by gravity. said oil descending over the outer surface of the chains which will be engaged by the animals as they pass through the door opening, thereby providing means for evenly distributing oil over the skin of the animals.

The tank 17 is designed to receive the disinfectant through a suitable filling opening 30 which is provided with a hinged cover 31 having a handle 31ª. Extending longitudinally through the tank 17 is a shaft 32 designed to receive a sleeve 33 provided with a series of radially extending arms 34 having their free ends connected with a bar 35 extending longitudinally with the tank 17, and adjacent to the inner walls of the said tank.

The outer end of each of the arms 34 is provided with a slot 36, each of which is designed to receive a bolt 37 for securing the bar 35 to the ends of the members 34 in a slidable manner.

The outer edge of the bar 35 is provided with a flexible member 38 designed to engage the inner face of the tank 17.

It will be seen that if the shaft 32 is rotated, the bar 35 will be swung about the center of said shaft adjacent to the inner face of the tank, and may be brought to a position where it is substantially vertically beneath the shaft 32. If the shaft is rotated in a counter-clockwise direction, as shown in Figure 2, the bar 35 will be elevated and the member 38 caused to engage the inner face of the tank, which will cause a certain amount of oil to be elevated and carried to the openings 28. The oil will then flow through the said openings 28 to the angle iron 29, and thence to the grooves 23, as before described.

For actuating the shaft 32 I have provided on the outer end of the shaft a crank arm 39 operatively connected with one end of a link 40. The free end of the link 40 is pivotally connected to a slide bar 41 which is slidably mounted on supporting brackets 42 rigidly secured to the inner face of the member 16. The lower end of the slide bar 41 is provided with a horizontally arranged angle iron 43.

Pivotally mounted beneath the lower end of the slide bar 41 I have provided a rock arm 44 secured in position by means of a pivot member 45. To the member 15 I have provided a similar pivot member and rock arm. Each of the rock arms is provided with a series of openings 46 which are for the purpose of adjustably connecting to the rock arms the free end of a U-shaped bar 47 by means of bolts 48. The free ends of the bar 47 are each designed to pass through a looped portion 49 on the lower end of each of the bars 44.

By this arrangement it will be seen that the horizontal portion of the bar 47 may be elevated or lowered and the distance between the bar and the lower side of the opening 11 varied. The upper end of the bar 44 is provided with an angle iron 49ª similar to the angle iron 43 and adapted to have one of its faces adjacent to the lower face of the member 43.

By this arrangement it will be seen that if an animal passes through the opening 11, it will engage the bar 47 and the same will be swung in the direction the animal is going. This will cause the upper end of the bar 44 to be moved through a circular path and the angle iron 49ª to take an angular position beneath the bar 43, and the said bar 43 to be elevated. As the bar 43 is elevated, the slide bar 41 will be elevated and in turn the link 40. This will cause the free end of the crank arm 39 to be elevated and in turn the members 34, which will distribute the oil, as before described.

The link 40 is adjustably attached to the arm 39 by means of a slot 50 and a pin 51. This provides means whereby the stroke of the member 34 may be adjusted as desired; and further provides means for adjusting the device so that it may be used with small or large animals. It will be readily seen that small animals will not oscillate the arms 37 through as great an angle as would larger animals. The bolts 48 and the openings 46 further provide means for adjusting the device to animals of various sizes.

The space between the tank 17 and the outer face of the member 13 is provided with a hinged cover 52 which is for the purpose of preventing dirt and foreign substances from collecting in the groove 23 and clogging the openings 24.

Thus it will be seen that I have provided an animal oiler of comparatively simple, durable and inexpensive construction, and one which is accurate and economical in its operation, and one which will distribute the oil or disinfectant evenly over the surface of the animals due to the fact that each time the animal passes through the door opening it is engaged by a large number of chains, each of which is distributing a very small amount of oil to various parts of the animal's skin. This is quite an advantage over methods which have previously been employed which simply supplies a large amount of oil to small areas of the animal's skin.

I claim as my invention:

1. A support adjacent to the runway of an animal, an elevated tank above the runway, an auxiliary chamber adjacent to one side of said tank, a cover for said auxiliary chamber, the bottom of said auxiliary chamber being provided with a longitudinal groove, said groove having in communication therewith a series of vertical openings, a depending chain for each of said openings extending downwardly into the said runway, means for supplying quantities of liquid from said tank to the longitudinal groove of said auxiliary chamber, and means actuated by the animal as it passes through said passage for imparting movement to the last said means.

2. A support, a tank having a filling opening, a cover for said opening designed to keep out dust, said tank being provided with a series of openings in one of its sides, a grooved block beneath said openings, said block being provided with a series of vertical openings communicating with the bottom of said grooves, each of said openings being provided with a depending chain, means for delivering oil from said tank to said openings, said openings and said chains being so arranged that the oil will be distributed to the chains by gravity, said support being mounted adjacent to the runway of an animal in such a manner that as the animal passes between the said depending chains the oil therefrom will be delivered to its skin, and means actuated by the animal as it passes between the chains for actuating said oil delivering means.

3. A horizontally arranged support, a tank parallel with said support and spaced therefrom a slight distance, means for mounting the tank in a rigid position relative to said support, a grooved block designed to act as a filler between said tank and said support, the groove of said block being provided with a series of vertical openings, means for supporting a chain to hang through each of said openings, said tank being provided with a series of openings slightly above the said grooved block, a shaft extending longitudinally through said tank provided with radial arms, a bar for connecting the free ends of said radial arms, said bar being provided with a flexible member designed to engage the inner face of the tank in such a manner that as the shaft is rotated the flexible member will be moved upwardly along the side of the container and carry oil to the said openings, means for mounting the said support in an elevated position so animals may pass beneath it, a lever mechanism actuated by the animals as they pass beneath said support for actuating said shaft.

4. A horizontally arranged support, a tank parallel with said support and spaced therefrom a slight distance, means for mounting the tank in a rigid position relative to said support, a grooved block designed to act as a filler between said tank and said support, the groove of said block being provided with a series of vertical openings, means for supporting a chain to hang through each of said openings, said tank being provided with a series of openings slightly above the said grooved block, a shaft extending longitudinally through said tank provided with radial arms, a bar for connecting the free ends of said radial arms, said bar being provided with a flexible member designed to engage the inner face of the tank in such a manner that as the shaft is rotated the flexible member will be moved upwardly along the side of the container and carry oil to the said openings, means for mounting the said support in an elevated position so animals may pass beneath it, a lever mechanism actuated by the animals as they pass beneath said support for actuating said shaft, the last said mechanism being provided with means for adjusting it for animals of different sizes.

5. A support adjacent to the runway of an animal, an elevated tank above the runway, an auxiliary chamber adjacent to one side of said tank, a cover for said auxiliary chamber, the bottom of said auxiliary chamber being provided with a longitudinal groove, said groove having in communication therewith a series of vertical openings, a depending chain for each of said openings extending downwardly into the said runway, means for supplying quantities of liquid from said tank to the longitudinal groove of said auxiliary chamber, and means actuated by the animal as it passes through said passage for imparting movement to the last said means, the last said means being adjustable to be actuated by the animals of various sizes.

6. A support adjacent to the runway of an animal, an elevated tank above the runway, an auxiliary chamber adjacent to one side of said tank, a cover for said auxiliary chamber, the bottom of said auxiliary chamber being provided with a longitudinal groove, said groove having in communication therewith a series of vertical openings, a depending chain for each of said openings extending downwardly into the said runway, means for supplying quantities of liquid from said tank to the longitudinal groove of said auxiliary chamber, means actuated by the animal as it passes through said passage for imparting movement to the last said means, and means for varying the quantities of oil delivered from said tank to said auxiliary chamber.

Des Moines, Iowa, April 27, 1923.

CHARLES R. STANTON.